June 21, 1927.　　　J. H. VAN AUSDAL ET AL　　　1,633,505

GOVERNOR

Filed July 21, 1926

James H. Van Ausdal
and Joseph T. Blackburn
INVENTORS

BY Victor J. Evans
ATTORNEY

WITNESS:

Patented June 21, 1927.

1,633,505

UNITED STATES PATENT OFFICE.

JAMES H. VAN AUSDAL AND JOSEPH T. BLACKBURN, OF VINITA, OKLAHOMA.

GOVERNOR.

Application filed July 21, 1926. Serial No. 123,999.

This invention comprehends the provision of an automatic speed control device for motor operated vehicles, susceptible of adjustment to prohibit the vehicle from travelling over a predetermined maximum speed.

One of the objects of the invention resides in the provision of a device for the above mentioned purpose which can be conveniently installed upon any make of automobile without any material change in the latter, and quickly and conveniently adjusted to control the maximum speed of the vehicle.

More specifically stated, the invention contemplates the use of a governor actuated valve arranged in the feed line between the supply tank of the vehicle and the carburettor therefor, which valve is automatically closed to cut off the supply of fuel to the motor when the vehicle attempts to travel above the maximum speed for which the device is set.

The nature and advantages of the invention will be better understood when the following detail description is read in connection with the accompanying drawing, the invention residing in the construction, combination and arrangement of parts as claimed.

In the drawings forming part of this application like numerals of reference indicate similar parts in the several views and wherein.

The device forming the subject matter of the present invention is adapted to be mounted on any convenient part of the vehicle at a point between the fuel tank and carburettor therefor, neither of which parts are herein illustrated. The device comprises a casing 10 including a base 11 adapted to be attached in any suitable manner to some convenient part of the vehicle, with the fuel supply pipe or line 12 passing through the base as illustrated. The casing 10 may vary in size and configuration without departing from the spirit of the invention, the casing housing the working parts of the invention, access to which may be readily had by opening the door 13, which is preferably locked by a key actuated lock of any suitable character.

Figure 1:
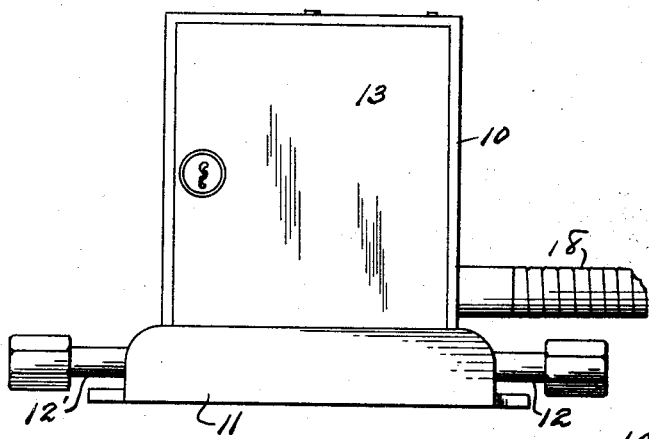
Figure 1 is a view in elevation of the device forming the subject matter of the present invention.
Figure 2:
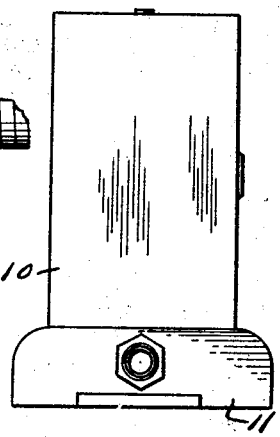
Figure 2 is a view taken at a right angle to Figure 1.
Figure 3:
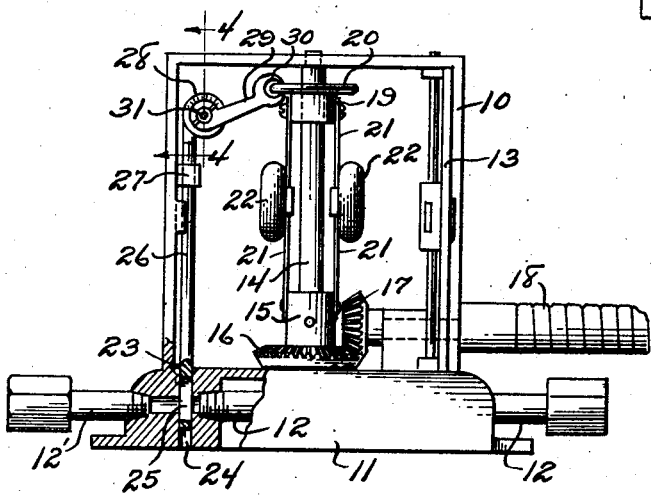
Figure 3 is a view similar to Figure 1 with the door of the device opened to illustrate the working parts, and showing the base partly in section.
Figure 4:
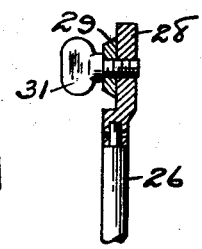
Figure 4 is a sectional view taken on line 4—4 of Figure 1.

Journaled within the casing 10 is the shaft 14 of a governor, and secured to the lower end of this shaft is a sleeve 15 provided with a bevel gear 16. This gear meshes with a pinion 17 arranged on one end of a flexible or other drive shaft 18, the latter entering the casing as clearly shown in Figure 3, the flexible or other drive shaft being driven in the ordinary well known manner from one of the front wheels or from the driving shaft of the vehicle (not shown). Slidably mounted on the shaft adjacent the upper end thereof, is a collar 19 formed with an annular flange 20, the purpose of which will be hereinafter described, while terminally connected with the collars 15 and 19 respectively are spaced flexible arms 21, each of which supports a weighted member 22 centrally thereof. If desired the collar 19 may be mounted upon the governor shaft 4. Manifestly the weights 22 are influenced by centrifugal force to flex the arms different degrees, depending upon the speed of rotation of the shaft 14, thus causing the collar 19 to move longitudinally of the shaft 14. The collar 19 is operatively associated with a sliding valve 23 to control the movements thereof, with a view of automatically cutting off the supply of fuel to the motor when the vehicle attempts to travel above a predetermined maximum speed.

In this connection it will be noted that the valve 23 slides through a passage 24 in the base 11 between the sections 12 and 12' of the fuel supply pipe, the valve being provided with an opening 25 which is normally disposed in alinement with the bores in said pipe sections, and that when the valve is moved downwardly under the influence of the governor above described, the opening 25 of the valve is moved out of alignment with said pipes, thereby cutting off the supply of fuel to the motor. The valve includes a rod or stem 26 which slides through a suitable guide 27 secured to one wall of the casing 10, while the upper end of this rod or stem is formed with an enlarged graduated disk 28. Pivoted on this disk is an arm 29, one end of which is bifurcated as at 30 to straddle the flange 20 of the collar 19, so that as the latter is moved longitudinally of the shaft 14, the movements of the valve 23 are automatically controlled. The arm 29 is susceptible of adjustment upon the pivot therefor, and is subsequently held fixed to the disk 28 by a suitable nut 31 threaded on said pivot, and in this manner the angular position of the arm with relation to the disk 20 can be varied, to regulate or control the maximum speed of the vehicle. In other words the arm 29 is provided with an indicating point which cooperates with the graduations on the disk 28, so that the maximum speed of the vehicle for which the arm is used to regulate, can be readily determined. The arm can thus be quickly adjusted for any desired speed, and subsequently held fixed with relation to the disk 28, which forms part of the valve stem 26.

In practice the valve 23 is normally maintained in an open position by reason of its connection with the sliding collar 19 of the governor. When the vehicle is in operation, the shaft 14 is rotated from the vehicle in the manner above described, and the weights 22 moved outwardly under the influence of centrifugal force. However while the valve can be moved under the influence of these weights, without effecting the speed or power of the vehicle, due to the size of the opening 25 in the valve, and as long as the vehicle is travelling within the limits of its maximum speed, for which the device is set to regulate, it is manifest that when the weights 22 move outwardly beyond certain calculated limits, the valve 23 will be automatically closed to cut off the supply of fuel to the motor, thereby checking the speed of the vehicle beyond a certain predetermined limit.

While it is believed that from the foregoing description, the nature and advantages of the invention will be readily apparent, we desire to have it understood, that we do not limit ourselves to what is herein shown and described and that such changes may be resorted to when desired as fall within the scope of what is claimed.

What is claimed is:

1. In an automatic speed control device for a vehicle having a fuel supply pipe, a valve operating in said pipe, a governor driven from the vehicle, an arm connecting the valve and governor, whereby the valve is automatically closed when the vehicle reaches a predetermined speed, said arm being capable of pivotal movement on the valve, for adjusting the governor, whereby the speed at which the valve is automatically closed can be regulated, and means for holding the valve and said arm fixed relatively for use.

2. In an automatic speed control device for a vehicle having a fuel supply pipe, a valve slidable in said pipe and including a stem, a governor driven from the vehicle, a graduated disk carried by the stem, an arm carried by said disk and connected with said governor, whereby the valve is automatically closed when the vehicle reaches a predetermined speed, said arm being capable of being moved pivotally and having an indicating point cooperating with the graduations on said disk, whereby the governor can be adjusted by means of said arm to regulate the speed at which the valve is automatically closed, and means for holding the arm and disk fixed relatively.

In testimony whereof we affix our signatures.

JAMES H. VAN AUSDAL.
JOSEPH T. BLACKBURN.